United States Patent [19]

Mowrer et al.

[11] Patent Number: 5,804,616

[45] Date of Patent: Sep. 8, 1998

[54] EPOXY-POLYSILOXANE POLYMER COMPOSITION

[75] Inventors: Norman R. Mowrer, La Habra; Raymond E. Foscante, Yorba Linda; J. Luis Rojas, Anaheim Hills, all of Calif.

[73] Assignee: Ameron International Corporation, Pasadena, Calif.

[21] Appl. No.: 790,730

[22] Filed: Jan. 27, 1997

Related U.S. Application Data

[63] Continuation-in-part of Ser. No. 342,414, Nov. 18, 1994, Pat. No. 5,618,860, which is a continuation-in-part of Ser. No. 64,398, May 19, 1993, abandoned.

[51] Int. Cl.$^6$ ............................................ C08K 3/20
[52] U.S. Cl. .............................. 523/421; 528/27; 528/28; 528/17; 528/18; 525/478; 106/287.11; 524/864
[58] Field of Search ............................ 523/421; 528/27, 528/38, 17, 18; 525/478; 106/287.11; 524/864

[56] References Cited

U.S. PATENT DOCUMENTS

| | | | |
|---|---|---|---|
| 3,183,198 | 5/1965 | Wagner | 260/18 |
| 3,297,724 | 1/1967 | McConnell et al. | 260/348 |
| 3,395,128 | 7/1968 | Hale et al. | 260/77.5 |
| 4,250,074 | 2/1981 | Foscante et al. | 260/32.8 |
| 4,385,158 | 5/1983 | Mikami et al. | 525/476 |
| 4,546,018 | 10/1985 | Ryuzo et al. | 427/407 |
| 4,678,835 | 7/1987 | Chang et al. | 525/100 |
| 4,851,481 | 7/1989 | Kuriyama et al. | 525/454 |
| 5,019,607 | 5/1991 | Coltrain et al. | 523/435 |

*Primary Examiner*—Margaret W. Glass
*Attorney, Agent, or Firm*—Christie, Parker & Hale, LLP

[57] ABSTRACT

Epoxy-polysiloxane polymer compositions of this invention are prepared by combining a resin component with a hardener component. The resin component comprises a non-aromatic epoxy resin ingredient and a polysiloxane ingredient. The hardener component comprises an amine and optionally an organotin catalyst. The composition can also include aggregates, pigments, and other additives depending on the particular end use. The composition is prepared using a sufficient amount of water to promote hydrolysis of the polysiloxane and the polycondensation of the silanols produced by such hydrolysis. In its cured form, the epoxy-polysiloxane composition exists as a uniformly dispersed arrangement of linear epoxy chain fragments that are crosslinked with a continuous polysiloxane polymer chain, thereby forming a non-interpenetrating polymer network chemical structure that has substantial advantages over conventional epoxy systems. Protective coatings formed from such compositions exhibit excellent weatherability in sunlight, and superior chemical and corrosion resistance after curing.

18 Claims, No Drawings

EPOXY-POLYSILOXANE POLYMER COMPOSITION

RELATION TO COPENDING PATENT APPLICATION

This patent application is a continuation-in-part to U.S. patent application Ser. No. 08/342,414, filed on Nov.18, 1994, now U.S. Pat. No. 5,618,860, which was a continuation-in-part to U.S. patent application Ser. No.08/064,398, filed on May 19, 1993, now abandoned.

FIELD OF THE INVENTION

This invention relates to epoxy resin based compositions useful for protective coatings and the like and, more specifically, to an epoxy-polysiloxane polymer composition having improved properties of flexibility, weatherability, compressive strength and chemical resistance.

BACKGROUND

Epoxy coating materials are well known and have gained commercial acceptance as protective and decorative coatings for steel, aluminum, galvanizing, wood and concrete in maintenance, marine, construction, architectural, aircraft and product finishing markets. The basic raw materials used to prepare these coatings generally comprise as essential components (a) an epoxy resin, (b) a hardener and (c) a pigment or aggregate component.

Known epoxy-based coating materials often contain several components in addition to the epoxy resin, hardener and pigment/aggregate, such as nonreactive and reactive diluents including mono- and di-epoxides, plasticizer, bituminous and asphaltic extenders, adhesion promoters, suspending agents and thixotropes, surfactants, corrosion inhibitors, ultraviolet light stabilizers, catalysts and rheological modifiers. Both the resin and hardener components may also contain volatile organic solvents that are used to lower the composition viscosity, thereby providing a consistency suitable for spray application with conventional air, airless and electrostatic spray equipment.

Epoxy-based protective coatings possess many properties which make them desirable as coating materials. They are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents.

Epoxy-based coating materials generally do not have good resistance to weathering in sunlight. While such coatings maintain their chemical and corrosion resistance, exposure to the ultraviolet light component of sunlight results in a surface degradation phenomenon known as chalking which changes both the gloss and color of the original coating. Where color and gloss retention is desired or required, epoxy-based protective coatings are typically top coated with a more weatherable coating, e.g., an alkyd, vinyl or aliphatic polyurethane coating. The end result is a two or sometimes three coat system which provides corrosion resistance and weatherability, but which is also labor intensive and expensive to apply.

Thus, while epoxy-based coating materials have gained wide commercial acceptance, the need nevertheless remains for epoxy-based materials with improved color and gloss retention, better chemical and corrosion resistance, and improved resistance to mechanical abuse. New epoxy coating materials are needed to comply with new governmental environmental and health hazard regulations. Epoxy coating materials with improved color and gloss retention are needed wherever they may be exposed to sunlight. An epoxy coating which does not chalk and does not require a weatherable topcoat is desirable. Coating materials with improved chemical, corrosion, impact and abrasion resistance are needed for both primary and secondary chemical containment structures, for protecting steel and concrete in chemical, power generation, rail car, sewage and waste water treatment, and paper and pulp processing industries.

Heretofore, epoxy coatings with improved weatherability have been obtained by modification with-acrylic resin or by curing inherently weatherable epoxy resins, e.g., sorbitol glycidyl ethers, hydrogenated reaction products of bisphenol A and epichlorhydrin, and more recently the epoxy-functional coetherified melamine resins from Monsanto with polyamide, cycloaliphatic amine or carboxyl functional acrylic or polyester resins. Another approach has been to use epoxidized polyester resins in combination with certain carboxyl-functional vehicles. While these coatings exhibit improved weatherability, their chemical and corrosion resistance is generally inferior to the epoxy resin based coatings previously described.

Therefore, it is an object of the present invention to provide an epoxy-based coating composition having improved chemical, corrosion and weathering resistance.

SUMMARY OF THE INVENTION

An epoxy-polysiloxane composition is prepared, according to principles of this invention, by combining the following ingredients:

(a) a resin component based on a blend of a non-aromatic epoxy resin having at least two 1,2-epoxide groups with a polysiloxane;

(b) a difunctional amine hardener component which may be substituted wholly or in part with an aminosilane;

(c) an optional catalyst;

(d) a pigment or aggregate component; and (e) water.

The epoxy-polysiloxane composition is prepared by using in the range of from about 10–60 percent by weight of the non-aromatic epoxy resin ingredient, 15 to 60 percent by weight polysiloxane, 5 to 40 percent by weight amine hardener, and up to about five percent by weight catalyst.

The above-identified ingredients react to form a non-interpenetrating network composition that comprises a continuous phase epoxy-polysiloxane copolymer. Epoxy-polysiloxane compositions of this invention display improved resistance to ultraviolet light and weathering in sunlight as well as improved chemical and corrosion resistance when compared to conventional epoxy resin based coatings. Additionally, epoxy-polysiloxane compositions of this invention display color and gloss retention that approaches a level exhibited by aliphatic polyurethanes and may, depending on application, obviate the need for top coating.

DETAILED DESCRIPTION

Epoxy-polysiloxane composition are prepared, according to principles of this invention, by combining in the presence of water;

(a) a resin component comprising a non-aromatic epoxide resin and polysiloxane;

(b) a hardener component;

(c) an optional organotin catalyst; and (d) an optional pigment and/or aggregate component.

Epoxy-polysiloxane compositions of this invention may also contain other components such as, rheological modifiers, plasticizers, thixotropic agents, antifoam agents and solvents and the like to achieve the desired properties sought by the user.

The resin component comprises a blend of epoxide resin and polysiloxane. Epoxy resins useful in forming the epoxy-polysiloxane composition are non-aromatic hydrogenated epoxy resins that contain more than one 1,2-epoxide groups per molecule. A preferred non-aromatic epoxy resin comprises two 1,2-epoxide groups per molecule. The epoxy resin is preferably in liquid rather than solid form, has an epoxide equivalent weight in the range of from about 100 to 5,000, and has a reactivity of about two.

Preferred epoxy resins include non-aromatic hydrogenated cyclohexane dimethanol and diglycidyl ethers of hydrogenated Bisphenol A-type epoxy resins, such as Epon DPL-862, Eponex 1510, Heloxy 107 and Eponex 1513 (hydrogenated bisphenol A-epichlorohydrin epoxy resin) from Shell Chemical in Houston, Texas; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulenc located in Lousiville, Ky.; Aroflint 393 and 607 from Reichold Chemicals located in Pensacola, Fla.; and ERL4221 from Union Carbide located in Tarrytown, N.Y. Other suitable non-aromatic epoxy resins include DER 732 and DER 736; Heloxy 67, 68, 107, 48, 84, 505 and 71 each from Shell Chemical; PolyBD-605 from Arco Chemical of Newtown Square, Pa.; Erisys GE-60 from CVC Specialty Chemicals, Cherry Hill, N.J.; and Fineclad A241 from Reichold Chemical.

Such non-aromatic hydrogenated epoxide resins are desired for their limited reactivity of about two, which promote formation of a linear epoxy polymer and prohibits formation of a cross-linked epoxy polymer. It is believed that the resulting linear epoxy polymer formed by adding the hardener to the epoxide resin is responsible for the enhanced weatherability of this composition. The use of such non-aromatic epoxy resins to form a weatherable protective coating has never before been explored because of the limited reactivity of the epoxy resin and, therefore, the perceived inability of the resin to cure to form a protective coating.

A preferred epoxy-polysiloxane composition comprises in the range of from 10 to 60 percent by weight epoxy resin. If the composition comprises less than about 10 percent by weight epoxide resin, chemical resistance of the coating will be compromised. If the composition comprises greater than about 60 percent by weight epoxy resin, the weatherability of the coating will be compromised. A particularly preferred composition comprises approximately 25 percent by weight non-aromatic epoxy resin.

With respect to the polysiloxane used to make up the resin component, preferred polysiloxanes include, but are not limited to, those having the following formula:

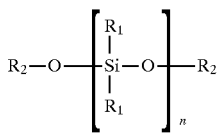

where each $R_1$ is selected from the group consisting of the hydroxy group and alkyl, aryl, and alkoxy groups having up to six carbon atoms. Each $R_2$ is selected from the group consisting of hydrogen and alkyl and aryl groups having up to six carbon atoms. It is preferred that $R_1$ and $R_2$ comprise groups having less than six carbon atoms to facilitate rapid hydrolysis of the polysiloxane, which reaction is driven by the volatility of the alcohol analog product of the hydrolysis. $R_1$ and $R_2$ groups having greater than six carbon atoms tend to impair the hydrolysis of the polysiloxane due to the relatively low volatility of each alcohol analog.

It is preferred that the "n" be selected so that the polysiloxane ingredient have a molecular weight in the range of from about 400 to about 10,000. A polysiloxane ingredient having a molecular weight of less than about 400 can produce a composition that would be brittle. A polysiloxane ingredient having a molecular weight of greater than about 10,000 can produce a composition having a viscosity outside a desired range of from about 3,000 to 15,000 centipoise (cP) at 20° C., making the composition too viscous for application without adding solvent in excess of current volatile organic content (VOC) requirements.

Preferred polysiloxane ingredients are alkoxy- and silanol-functional polysiloxanes. Particularly preferred alkoxy-functional polysiloxanes are madhouse-functional polysiloxanes and include, but are not limited to: DC-3074 and DC-3037 from Dow Corning; GE SR191, SY-550, and SY-231 from Wacker located in Adrian, Mich. Preferred silanol-functional polysiloxanes include, but are not limited to, Dow Corning's DC840, Z6018, Q1-2530 and 6-2230 intermediates.

A preferred epoxy-polysiloxane composition comprises in the range of from 15 to 60 percent by weight polysiloxane. Using an amount of the polysiloxane ingredient outside of this range can produce a composition having inferior weatherability and chemical resistance. A particularly preferred epoxy-polysiloxane composition comprises approximately 30 percent by weight polysiloxane.

The hardener component comprises an amine chosen from the general classes of aliphatic amines, aliphatic amine adducts, polyamidoamines, cycloaliphatic amines and cycloaliphatic amine adducts, aromatic amines, Mannich bases and ketimines. A preferred hardener component comprises a difunctional amine, i.e., an amine having two active hydrogens, which may be substituted wholly or in part with an aminosilane having the general formula:

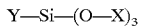

where Y is $H(HNR)_a$, and where "a" is equal to one, each R is a difunctional organic radical independently selected from the group consisting of aryl, alkyl, dialkylaryl, alkoxyalkyl, and cycloalkyl radicals, and where R can vary within each Y molecule. Each X can be the same or different, and is limited to alkyl, hydroxyalkyl, alkoxyalkyl and hydroxyalkoxyalkyl groups containing less than about six carbon atoms. At least 0.7 equivalents of amine or 0.2 moles of aminosilane per equivalent of epoxy may be present in the hardener component.

Preferred aminosilanes include, but are not limited to: aminoethyl aminopropyl triethoxysilane, n-phenylaminopropyl trimethoxysilane, trimethoxysilylpropyl diethylene triamine, 3-(3-aminophenoxy)propyl trimethoxy silane, amino ethyl amino methyl phenyl trimethoxy silane, 2 amino ethyl 3 aminopropyl, tris 2 ethyl hexoxysilane, n-aminohexyl aminopropyl trimethoxysilane and trisaminopropyl trismethoxy ethoxy silane.

The manufacturers and trade names of some aminosilanes useful in the present invention are listed in Table 1

TABLE 1

| Aminosilanes | |
| --- | --- |
| Manufacturer | Product Designation |
| Dow Corning | Z6020, XI-6100, XI6150 |
| Union Carbide | A1100, A1101, A1102, A1108, A1110, A1120 A1126, A1130, A1387, Y9632 |
| Wacker | ED117 |
| Hüls | A0696, A0698, A0699, A0700, A0710, A0720, A0733, A0733, A0742, A0750, A0800 |
| PCR | 12328-1 |

Preferred aminosilanes are difunctional silanes that include aminopropyltrimethoxysilane and aminopropyltriethoxysilane. A particularly preferred aminosilane is Union Carbide A1100. A difunctional aminosilane is desired because it has been found that the combination of an aminosilane having a reactivity of two, i.e., having only two amine hydrogens, reacts with the non-aromatic epoxy, also having a reactivity of two, to form a linear noncross-linked epoxy polymer that displays improved weatherability.

Such preferred amines and aminosilanes produce epoxy-polysiloxane compositions that, when applied as a substrate coating, exhibit superior weatherability in terms of both color and gloss retention. A preferred epoxy-polysiloxane composition comprises in the range of from 5 to 40 percent by weight amine and/or aminosilane. Using an amount of the amine and/or aminosilane ingredient outside of this range can produce a composition having inferior weatherability and chemical resistance. A particularly preferred epoxy-polysiloxane composition comprises approximately 15 percent by weight amine and/or aminosilane. Accordingly, a preferred coating composition according to practice of the present invention may comprise a weight ratio of polysiloxane to amine and/or aminosilane of approximately two to one.

In preparing epoxy-polysiloxane compositions of the present invention, the proportion of hardener component to resin component can vary over a wide range, regardless of whether the hardener is chosen from the general classes of amines, or from an aminosilane of the general formula above, or any combination thereof. In general, the epoxy resin component is cured with sufficient hardener to provide at least from about 0.7 to about 1.2 amine equivalent weight per 1 epoxide equivalent weight or with at least 0.2 moles of aminosilane per epoxide equivalent weight. If the amount of hardener added provides less than 0.7 amine equivalent weight per epoxide equivalent weight, the coating and flooring composition produced will exhibit a slow cure time and have inferior weatherability and chemical resistance. If the amount of hardener added provides greater than 1.2 amine equivalent weight per epoxide equivalent weight, the coating and flooring composition produced will exhibit surface blushing or greasiness.

Epoxy-polysiloxane compositions of this invention are formulated for application with conventional air, airless, air-assisted airless and electrostatic spray equipment, brush, or roller. The compositions are intended to be used as protective coatings for steel, galvanizing, aluminum, concrete and other substrates at dry film thicknesses in the range of from 25 micrometers to about two millimeters. Accordingly, pigment or aggregate ingredients useful in forming the composition are selected from a fine particle size material, preferably having at least 90 weight percent greater than 325 mesh U.S. sieve size.

Suitable pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition is understood to vary, depending on the particular composition application, and can be zero when a clear composition is desired. A preferred epoxy-polysiloxane composition may comprise up to about 50 percent by weight fine particle size pigment and/or aggregate. Using greater than 50 percent by weight fine particle size pigment and/or aggregate ingredient can produce a composition that is too viscous for application. Depending on the particular end use, a preferred coating composition may comprise approximately 20 percent by weight fine particle size aggregate and/or pigment.

The pigment and/or aggregate ingredient is typically added to the epoxy resin portion of the resin component and is dispersed with a Cowles mixer to at least 3 Hegman fineness of grind, or alternatively is ball milled or sand milled to the same fineness of grind before addition of the polysiloxane ingredient. Selection of a fine particle size pigment or aggregate and dispersion or milling to about 3 Hegman grind allows for the atomization of mixed resin and cure components with conventional air, air-assisted airless, airless and electrostatic spray equipment, and provides a smooth, uniform surface appearance after application.

Water is an important ingredient of the present invention and should be present in an amount sufficient to bring about both the hydrolysis of the polysiloxane and the subsequent condensation of the silanols. The sources of water are mainly atmospheric humidity and adsorbed moisture on the pigment or aggregate material. Additional water may be added to accelerate cure depending on ambient conditions, such as the use of the coating and flooring composition in arid environments. A preferred epoxy-polysiloxane composition comprises up to a stoichiometric amount of water to facilitate hydrolysis. Compositions that are prepared without added water may not contain the amount of moisture needed for the hydrolysis and condensation reactions, and may therefore produce a composition product having an insufficient degree of ultraviolet, corrosion and chemical resistance. Compositions that are prepared using greater than about two percent by weight water tend to hydrolyze and polymerize to form an undesirable gel before application. A particularly preferred epoxy-polysiloxane composition is prepared by using approximately one percent by weight water.

If desired, water may be added to either the epoxide resin or polyamine hardener. Other sources of water may include trace amounts present in the epoxide resin, polyamine hardener, thinning solvent, or other ingredients. Water may also be incorporated by using ketimines or alcohol-solvent-water mixtures as described in U.S. Pat. No. 4,250,074 herein incorporated by reference. Regardless of its source, the total amount of water that is used should be the stoichiometric amount needed to facilitate the hydrolysis reaction. Water exceeding the stoichiometric amount is undesirable since excess water acts to reduce the surface gloss of the finally-cured composition product.

Up to about five percent by weight catalyst may be added to the resin component, or may be added as an entirely separate component, to speed drying and curing of the modified epoxy coating and flooring materials of the present invention. Useful catalysts include metal driers well known in the paint industry, e.g. zinc, manganese, zirconium, titanium, cobalt, iron, lead and tin each in the form of octoates, neodecanates and naphthanates. Suitable catalysts include organotin catalysts having the general formula

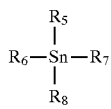

where R5 and R6 are each selected from the group consisting of alkyl, aryl, and alkoxy groups having up to eleven carbon atoms, and where R7 and R8 are each selected from the same groups as R5 and R6, or from the group consisting of inorganic atoms such as halogens, sulphur or oxygen. Dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanol amine may be used alone or in combination to accelerate hydrolytic polycondensation of polysiloxane and silane. A preferred catalyst is dibutyl tin dilaurate.

Epoxy-polysiloxane compositions of the present invention are generally low in viscosity and can be spray applied without the addition of a solvent. However, organic solvents may be added to improve atomization and application with electrostatic spray equipment or to improve flow and leveling and appearance when applied by brush, roller, or standard air and airless spray equipment. Exemplary solvents useful for this purpose include esters, ethers, alcohols, ketones, glycols and the like. The maximum amount of solvent added to compositions of the present invention is limited by government regulation under the Clean Air Act to approximately 420 grams solvent per liter of the composition.

Epoxy-polysiloxane compositions of the present invention may also contain rheological modifiers, plasticizers, antifoam agents, thixotropic agents, pigment wetting agents, bituminous and asphaltic extenders, antisettling agents, diluents, UV light stabilizers, air release agents and dispersing aids. A preferred epoxy-polysiloxane composition may comprise up to about ten percent by weight such modifiers and agents.

Epoxy-polysiloxane compositions of the present invention are supplied as a two-package system in moisture proof containers. One package contains the epoxy resin, polysiloxane, any pigment and/or aggregate ingredient, additives and solvent if desired. The second package contains polyamine and/or aminosilane and optionally catalysts or accelerating agents.

Epoxy-polysiloxane compositions of the present invention can be applied and fully cure at ambient temperature conditions in the range of from about −6° C. to 50° C. At temperatures below −18° C. cure is severely retarded. However, compositions of the present invention may be applied under bake or cure temperatures up to 150° C. to 200° C.

While not wishing to be bound by any particular theory, it is believed that epoxy-polysiloxane compositions of the present invention are cured by: (1) the reaction of the epoxy resin with the amine and/or aminosilane hardener to form epoxy polymer chains; (2) the hydrolytic polycondensation of the polysiloxane ingredient to produce alcohol and polysiloxane polymer; and (3) the copolymerization of the epoxy polymer chains with the polysiloxane polymer to form a fully-cured epoxy-polysiloxane polymer composition. When an aminosilane is used to make up the hardener component, the amine moiety of the aminosilane undergoes the epoxy-amine addition reaction and the silane moiety of the aminosilane undergoes hydrolytic polycondensation with the polysiloxane. In its cured form, the epoxy-polysiloxane composition exists as a uniformly dispersed arrangement of linear epoxy chain fragments that are cross-linked with a continuous polysiloxane polymer chain, thereby forming a non-interpenetrating polymer network (IPN) chemical structure that has substantial advantages over conventional epoxy systems.

When the ingredients are combined, it is believed that the silane moiety of the aminosilane ingredient condenses with the polysiloxane ingredient, and the epoxy resin undergoes chain extension with by reaction with the amino groups pendent from the polysiloxane to form a fully-cured epoxy-polysiloxane polymer composition. In such reaction it is believed that the epoxy resin functions as a cross-linking enhancer that adds to the cross-link density of the composition without diminishing the beneficial features of the polysiloxane.

In isolation, the epoxy resin reacts with the aminosilane to form epoxy polymer chain fragments, and the polysiloxane and aminosilane undergo hydrolytic polycondensation to form a polysiloxane polymer. The reaction kinetics for each polymerization are substantially different, thereby preventing IPN formation. For example, the time for polymerization of the epoxy resin is about six times that of the polymerization of the polysiloxane polymer. It is believed that the relative longer amount of time needed to polymerize the non-aromatic epoxy resin is due to the inherent unreactivity of the non-aromatic epoxy resins when compared to high reactivity of aromatic or unsaturated epoxy resins.

Ultimately, the chemical and physical properties of the epoxy-polysiloxane composition of the present invention are affected by judicious choice of epoxy resin, polysiloxane, amine and/or aminosilane hardener and pigment or aggregate components. An epoxy-polysiloxane composition that is prepared by combining a difunctional aminosilane with a non-aromatic epoxy resin displays improved resistance to caustic, is weatherable, allows infinite recoatability, provides abrasion resistance better than a polyurethane, which is completely unpredictable because siloxane polymers and epoxy polymers are known to have terrible abrasion resistance. Epoxy-polysiloxane compositions of the present invention exhibit an unexpected and surprising improvement in chemical corrosion and weathering resistance as well as high tensile and compressive strength and excellent impact and abrasion resistance.

These and other features of the present invention will become more apparent upon consideration of the following examples. Refer to Table 2 for a description of the ingredients used in Examples 1 through 4. In each example, the ingredients used are combined in the proportions described by weight in grams.

TABLE 2

| Ingredient | Description |
|---|---|
| Eponex 1513 | Shell epoxy resin. Eq. Wt. = 230 |
| Epodil 757 | Pacific Anchor cyclohexanedimethanol diglycidyl ether |
| Aroflint 607 | Reichold epoxide resin |
| DC-3074 | Dow Corning madhouse functional polysiloxane |
| A-1100 | Carbide aminopropyl trimethoxysilane |
| Y-9632 | Carbide proprietary aminosilane |
| Z6020 | Dow Corning aminoethyl aminopropyl trimethoxysilane |
| ED-117 | Wacker proprietary aminosilane |
| Euredur 3265 | Schering Berlin polyamine Eq. Wt. = 400 |
| Ancamine 1942 | Pacific Anchor polyamine Eq. Wt. = 70 |
| DCH-99% | Dupont diaminocyclohexane |
| Araldite R972 | Ciba Geigy methylene bis dianiline Eq. Wt. = 48 |
| Nuosperse 657 | Pigment wetting agent |
| Tioxide RTC 60 | Titanium dioxide |
| F-75 | 40 mesh silica sand |
| Crystal Silica #70 | 70 mesh silica sand |
| Silcosil 325 | U.S. silica flour |
| Dislon 6500 | King Industries thixotrope |
| BYK 080 | BYK-Chemie defoamer |

EXAMPLES

Examples 1 through 4 describe the preparation of the resin component of the composition, and the combination of the pigment or aggregate material of the present invention as used for coating purposes. In each example, the types and proportions of ingredients used to make up the resin and pigment blend are slightly varied. A portion of each resin and pigment blend as prepared in each example is then combined with a various hardener components and solvents in different proportions as shown in Table 3. Each resulting epoxy-polysiloxane composition was tested for cure time, weathering resistance, corrosion resistance and chemical resistance as shown in Table 3.

EXAMPLE 1

A resin and pigment blend was prepared by combining 385 grams of Eponex 1513 (epoxide resin), 5 grams of Nuosperse 657 (pigment wetting agent), 5 grams of BYK 080 (antifoam agent), 10 grams of Dislon 6500 (thixotropic agent) and 338 grams of Tioxide RTC60 (titanium dioxide). The ingredients were added to a one quart can and dispersed to 5 Hegman fineness of grind using an air-motor powered Cowles dissolver. This required about 20 minutes, after which time 432 grams DC-3074 (polysiloxane) was added and the combined mixture was then stirred until uniform. The resin blend had a Brookfield viscosity of approximately 10,000 cP at 70° F. (20° C.) and a calculated equivalent weight of 315 grams per equivalent.

EXAMPLE 2

A resin and pigment blend was prepared by combining 390 grams of Epodil 757 (epoxide resin), 5 grams of Nuosperise 657 (pigment wetting agent), 5 grams of BYK 080 (antifoam agent), 10 grams of Dislon 6500 (thixotropic agent) and 338 grams of Tioxide RTC 60 (titanium dioxide). The ingredients were added to a one quart can and dispersed to 5 Hegman fineness of grind using an air-motor powered Cowles dissolver. This required about 20 minutes, after which time 432 grams DC-3074 (polysiloxane) was added and the combined mixture was stirred until uniform. The resin blend had a Brookfield viscosity of approximately 3,800 cP at 70° F. (20° C.) and a calculated equivalent weight of 265 grams per equivalent.

EXAMPLE 3

The same ingredients and procedure used to prepare the resin and pigment blend of Example 1 was used, except that 356 grams of Aroflint 607 (epoxide resin) was used instead of 385 grams of Eponex 1513 (epoxide resin). The resin blend had a Brookfield viscosity of approximately 6,800 cP at 70° F. (20° C.) and a calculated equivalent weight of 338 grams per equivalent.

COMPARISON EXAMPLE 4

An epoxy resin and pigment blend was prepared by combining 711 grams of Epon 828 (epoxide resin), 5 grams of Nuosperse 657 (pigment wetting agent), 5 grams of BYK 080 (antifoaming agent), 10 grams of Dislon 6500 (thixotropic agent) and 338 grams of Tioxide RTC 60 (titanium dioxide). This comparison example did not include the polysiloxane ingredient The ingredients were added to a 1 quart can and dispersed to less than 5 Hegman fineness of grind using an air-motor powered Cowles dissolver. The mixture was thinned with 100 grams of xylene to reduce viscosity and then mixed until uniform. The resin blend had a Brookfield viscosity of approximately 12,000 cP at 70° F. (20° C.) and the calculated equivalent weight was 313 grams per equivalent.

Three hundred grams of the resin blend of Example 1 was mixed with 48 grams of Union Carbide A-1100 (aminopropyl trimethoxysilane) and 20 grams of butyl acetate (organic solvent). The mixture was then spray applied to sandblasted steel test panels using a DeVilbiss air-atomizing spray gun. The coating dried to touch in less than one hour and was dry through in about eight hours. The coating composition displayed initial 60° gloss of 90.

The resin blends of Examples 1, 2 and 3 and Comparison Example 4 were mixed with the hardeners and solvents shown in Table 3 and applied to test panels in a similar manner.

The compositions prepared according to Table 3 were tested for curing time, weathering resistance, corrosion resistance and chemical resistance according to the following ASTM and industry test methods:

1. ASTM G53, sometimes called QUV accelerated weathering, is an accelerated test intended to simulate the deterioration of coatings caused by sunlight and water as rain or dew. Test panels are exposed to alternating ultraviolet light and condensing humidity cycles. Degradation is measured by loss of gloss or rusting and blistering of the coating.
2. ASTM B117 measures the corrosion resistance of coated panels exposed to salt spray (fog) under prescribed conditions. Panels are checked periodically and rated for blistering and rusting according to ASTM D1654. The rating test method uses a 1 to 10 scale with 10 indicating no change.
3. Chemical Resistance, Union Carbide Method C117, measures the resistance of coatings to ten different reagents. One milliliter of each reagent is placed on the test coating and covered with a watch glass. After 24 hours, the reagents are removed and any change is rated on a scale of 1 to 10 with 10 indicating no change, 8 indicating some change, 6 indicating major change, 4 indicating partial failure and 2 indicating complete failure.

TABLE 3

Epoxy-polysiloxane Composition (coating)

| | Weight (grams) | | | | | | |
|---|---|---|---|---|---|---|---|
| Example 1 | 300 | 300 | 300 | 300 | — | — | — |
| Example 2 | — | — | — | — | 300 | — | — |
| Example 3 | — | — | — | — | — | 300 | — |
| Comparison Example 4 | — | — | — | — | — | — | 300 |
| butyl acetate | 20 | 20 | 20 | 20 | 15 | 20 | 25 |
| A1100 | 48.3 | — | — | — | 57.9 | — | — |
| ED-117 | — | 54.9 | — | — | — | — | — |
| Y-9632 | — | — | 48.0 | — | — | 45.0 | — |
| DCH-99% | — | — | — | 15.0 | — | — | — |
| Versamid 125 | — | — | — | — | — | — | 86.3 |
| Test Results | | | | | | | |
| Dry film thickness (mm) | 6 | 6 | 6 | 6 | 6 | 6 | 6 |
| Dry to touch (hours) | 1 | 1 | 1.2 | 1.5 | 1.5 | 1 | 1.5 |
| Dry through (hours) | 8 | 6 | 10 | 16 | 16 | 12 | 20 |
| QUV Accelerated Weathering | | | | | | | |
| 60° gloss-initial | 90 | 91 | 90 | 86 | 75 | 22 | 65 |
| 1 day | — | 91 | 91 | 65 | — | — | 3 |
| 7 days | 52 | 90 | 66 | 48 | 58 | 13 | 1 |
| 21 days | — | 75 | 36 | — | — | — | — |
| Salt Fog-(1000 hours) | | | | | | | |
| blistering | 10 | 10 | — | — | — | — | 10 |
| rusting | 10 | 10 | — | — | — | — | 8 |
| Chemical Resistance | | | | | | | |
| NaOH (50%) | 10 | 10 | — | — | — | — | 10 |
| HCl (conc.) | 10 | 10 | — | — | — | — | 8 |
| $H_2SO_4$(conc.) | 10 | 10 | — | — | — | — | 4 |
| phenol | 8 | 8 | — | — | — | — | 4 |
| $H_3PO_4$(conc.) | 10 | 10 | — | — | — | — | 6 |
| $NH_4OH$ | 10 | 10 | — | — | — | — | 10 |
| ethanol | 10 | 10 | — | — | — | — | 10 |
| acetic acid(conc.) | 8 | 8 | — | — | — | — | 4 |
| cumene | 10 | 10 | — | — | — | — | 10 |
| acetone | 10 | 10 | — | — | — | — | 10 |

Gloss retention in QUV accelerated weathering, salt fog testing and chemical spot tests clearly show that coatings formed from epoxy-polysiloxane compositions of the present invention have improved chemical, corrosion and weathering resistance when compared to conventional epoxy-based coatings compositions.

Although epoxy-polysiloxane compositions of the present invention have been described with considerable detail with reference to certain preferred variations thereof, other variations are possible. Therefore, the spirit and scope of the appended claims should not be limited to the preferred variations described herein.

What is claimed is:

1. A cross-linked epoxy-polysiloxane polymer composition prepared by combining:

water; with a polysiloxane having the formula

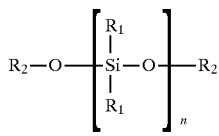

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 10,000;

a non-aromatic epoxy resin having more than one 1,2-epoxide groups per molecule with an epoxide equivalent weight in the range of from 100 to about 5,000; and a sufficient amount of an aminosilane hardener component having two amine hydrogens to react with the epoxide groups in the epoxy resin to form epoxy chain polymers, and to react with the polysiloxane to form polysiloxane polymers, wherein the epoxy chain polymers and polysiloxane polymers copolymerize to form a cured cross-linked epoxy-polysiloxane polymer composition.

2. The composition as recited in claim 1 wherein the non-aromatic epoxide resin is selected from the group of cycloaliphatic epoxy resins consisting of hydrogenated cyclohexane dimethanol and diglycidyl ethers of hydrogenated Bisphenol A epoxide resins.

3. The composition as recited in claim 1 wherein the aminosilane has the general formula

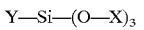

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxalkyl, alkoxyalkyl or hydroxyalkoxyalkyl groups containing less than about six carbon atoms.

4. The composition as recited in claim 1 wherein the composition additionally comprises at least one metal catalyst to facilitate cure at ambient temperature, wherein the catalyst is selected from the group consisting of zinc, manganese, zirconium, titanium, cobalt, iron, lead, and tin each in the form of octonates, neodecanates, or naphthanates.

5. The composition as recited in claim 1 comprising at least one additional ingredient selected from the group consisting of rheological modifiers, plasticizers, antifoam agents, thixotropic agents, pigment wetting agents, bituminous and asphaltic extenders, antisettling agents, diluents, UV light stabilizers, air release agents, dispersing aids, and mixtures thereof.

6. The composition as recited in claim 1 further comprising a pigment or aggregate material having a fine particle size selected from the group consisting of organic and inorganic color pigments, at least 90 percent by weight of the pigment being greater than 325 mesh U.S. sieve size.

7. The composition as recited in claim 1 comprising in the range of from about 10 to 60 percent by weight epoxy resin, 15 to 60 percent by weight polysiloxane, and 5 to 40 percent by weight aminosilane hardener based on the total weight of the composition.

8. An epoxy-polysiloxane polymer composition prepared by combining:

a polysiloxane selected from the group consisting of alkoxy- and silanol-functional polysiloxanes having a molecular weight in the range of from about 400 to 10,000; with non-aromatic epoxy resin having more than one epoxide group per molecule;

a sufficient amount of an aminosilane hardener component having two amine hydrogens providing in the range of from 0.7 to 1.2 amine equivalent weight per one epoxide equivalent weight having the general formula $$Y-Si-(O-X)_3$$

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxalkyl, alkoxyalkyl or hydroxyalkoxyalkyl groups containing less than about six carbon atoms, wherein the aminosilane hardener reacts with the epoxy resin to form epoxy chain polymers, and reacts with the polysiloxane to form polysiloxane polymers that copolymerize with the epoxy chain polymers to form a cross-linked epoxy-polysiloxane composition;

an organotin catalyst; and a sufficient amount of water to facilitate hydrolysis and polycondensation reactions to form the fully-cured cross-linked epoxy-polysiloxane polymer composition at ambient temperature.

9. The composition as recited in claim 8 comprising in the range of from about 10 to 60 percent by weight epoxy resin based on the total weight of the composition, wherein the epoxy resin has an epoxide equivalent weight in the range of from 100 to 5,000.

10. The composition as recited in claim 9 wherein the epoxy resin is selected from the group of cycloaliphatic epoxy resins consisting of hydrogenated cyclohexane dimethanol and diglycidyl ethers of hydrogenated Bisphenol A epoxide resins.

11. The composition as recited in claim 8 comprising in the range of from 15 to 60 percent by weight polysiloxane based on the total weight of the composition, wherein the polysiloxane has the formula

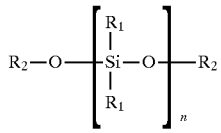

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is greater than about 400.

12. The composition as recited in claim 8 further comprising additives up to approximately ten percent by weight of the total composition, wherein the additives are selected from the group consisting of flow modifiers, rheological modifiers, plasticizers, antifoam agents, thixotropic agents, pigment wetting agents, bituminous and asphaltic extenders, antisettling agents, diluents, UV light stabilizers, air release agents, and dispersing aids.

13. The composition as recited in claim 8 further comprising a fine particle size pigment or aggregate material selected from the group consisting of organic and inorganic color pigments, wherein the aggregate material comprises at least 90 percent by weight aggregate having a U.S. mesh size greater than 325 based on the total weight of the aggregate material.

14. A non-interpenetrating polymer network epoxy-polysiloxane polymer composition prepared by combining:

water; with a polysiloxane having the formula

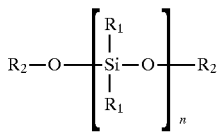

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 10,000;

a non-aromatic epoxy resin having more than one 1,2-epoxide group per molecule with an epoxide equivalent weight in the range of from 100 to about 5,000; and a stoichiometric amount of an aminosilane hardener component to react both with the epoxy resin to form epoxy resin polymers and the polysiloxane to form polysiloxane polymers, and has the general formula $$Y-Si-(O-X)_3$$

where Y is $H(HNR)_a$ and where a is one, R is a difunctional organic radical independently selected from the group consisting of aryl, alkyl, dialkylaryl, alkoxyalkyl, and cycloalkyl radicals, and where X is limited to alkyl, hydroxalkyl, alkoxyalkyl or hydroxyalkoxyalkyl groups containing less than about six carbon atoms;

wherein the epoxy resin polymers and polysiloxane polymers react together to form a cross-linked non-interpenetrating polymer network epoxy-polysiloxane polymer.

15. A method for making a fully-cured thermosetting epoxy-polysiloxane polymer composition comprising the steps of:

forming a resin component by combining:
a non-aromatic epoxy resin;
a polysiloxane selected from the group consisting of alkoxy- and silanol-functional polysiloxanes having a molecular weight in the range of from 400 to 10,000; with
water; and curing the resin component at ambient temperature by adding thereto:
an aminosilane with two active hydrogens that reacts both with the epoxide resin to form epoxy chain polymers and with the polysiloxane to form polysiloxane polymers, wherein the epoxy chain polymers react with the polysiloxane polymers to form a fully-cured cross-linked epoxy-polysiloxane polymer; and
an organotin catalyst to facilitate curing the resin component at ambient temperature.

16. A method as recited in claim 15 wherein during the step of forming the resin component one or more ingredient is added that is selected from the group consisting of pigments, aggregates, flow modifiers, theological modifiers, plasticizers, antifoam agents, thixotropic agents, pigment wetting agents, bituminous and asphaltic extenders, antisettling agents, diluents, UV light stabilizers, air release agents and dispersing aids.

17. A method for making a fully-cured epoxy-polysiloxane copolymer composition comprising the steps of:

forming a resin component by combining:
   a polysiloxane having the formula

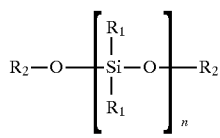

where each $R_1$ is selected from the group consisting of the hydroxy group and alkyl, aryl and alkoxy groups having up to six carbon atoms, each $R_2$ is selected from the group consisting of hydrogen and alkyl and aryl groups having up to six carbon atoms and, wherein n is selected so that the molecular weight for the polysiloxane is in the range of from about 400 to 10,000;

a non-aromatic epoxy resin having more than one 1,2-epoxide groups per molecule with an epoxide equivalent weight in the range of from 100 to about 5,000; and
   water;
   curing the resin component at an ambient temperature by adding to it:
   an organotin catalyst; and
   a stoichiometric amount of an aminosilane component having two active hydrogens to react both with the epoxy resin to form epoxy resin chain polymers and react with the polysiloxane to form polysiloxane polymers, wherein the epoxy resin chain polymers react with the polysiloxane polymers to form a fully-cured cross-linked epoxy-polysiloxane polymer.

18. A cross-linked epoxy-polysiloxane copolymer composition that is prepared by combining:
   a polysiloxane selected from the group consisting of alkoxy- and silanol-functional polysiloxanes having a molecular weight in the range of from 400 to 10,000; with
   a non-aromatic epoxy resin having more than one epoxide group per molecule;
   a sufficient amount of an aminosilane ingredient to provide in the range of from 0.7 to 1.2 amine equivalent weight amine per one epoxide equivalent weight to both react with the epoxy resin to form epoxy chain polymers, and polysiloxane to form polysiloxane polymers that copolymerize to form a cross-linked epoxy-polysiloxane copolymer composition.

* * * * *